Jan. 6, 1931.  W. S. GATTRELL  1,787,476
DRIVING MEANS FOR FLUSH JOINT DRILL STEMS
Filed Aug. 26, 1929    2 Sheets-Sheet 2

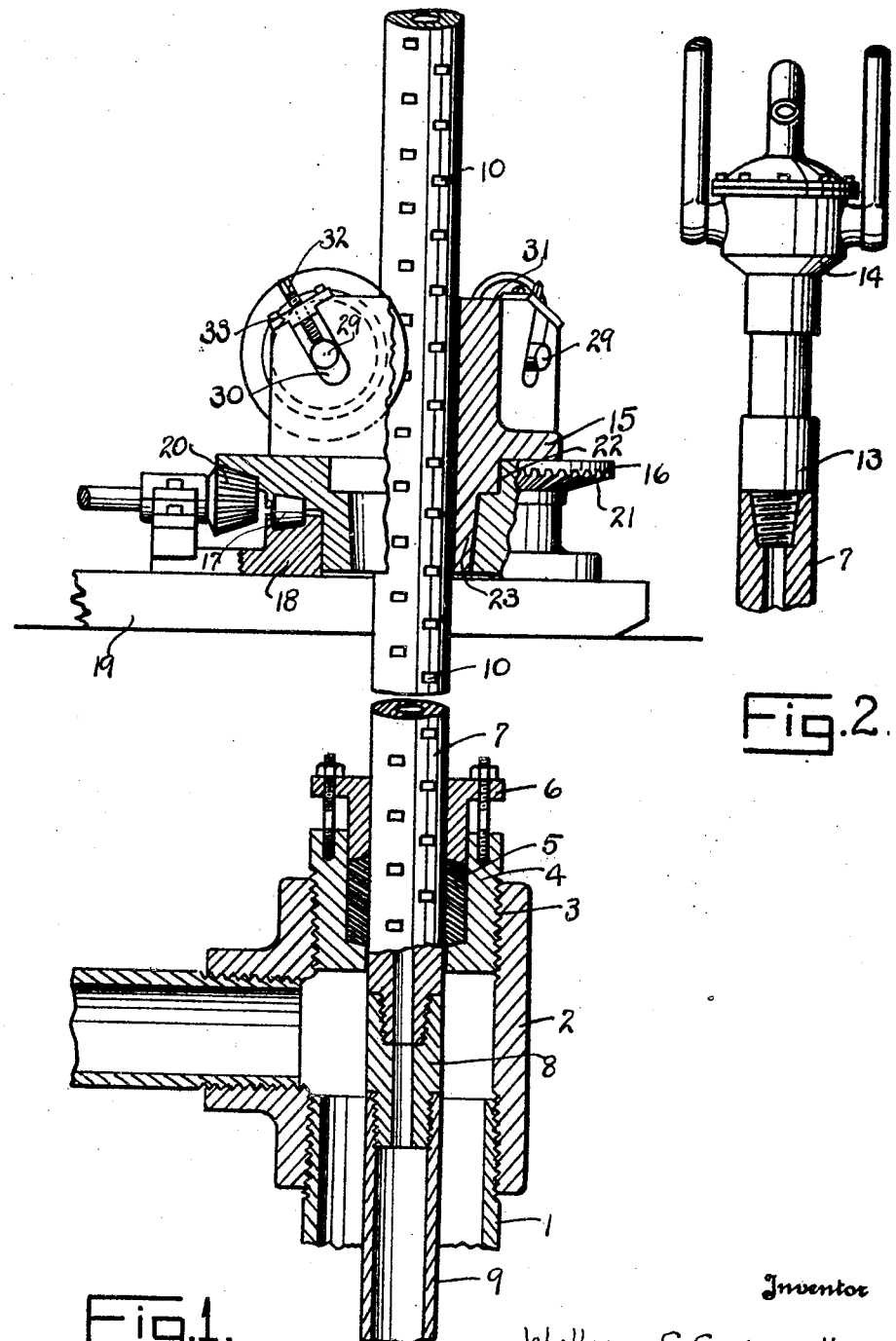

William S Gattrell  Inventor

By Jesse R. Stone.

Attorney

Patented Jan. 6, 1931

1,787,476

UNITED STATES PATENT OFFICE

WILLIAM S. GATTRELL, OF TAMPICO, MEXICO

DRIVING MEANS FOR FLUSH-JOINT DRILL STEMS

Application filed August 26, 1929. Serial No. 388,421.

My invention relates to means for communicating a rotating motion to a drill stem upon which flush joints are used and which must be adapted to operate thru a stuffing box at the upper end of the well casing.

In drilling wells under gas pressure it is customary in some sections to provide at the upper end of the well casing a stuffing box thru which the drill stem operates. This stuffing box prevents the escape of gas or other fluid about the drill stem while it is being operated. In order to employ a stuffing box it is necessary that the drive stem or Kelley joint at the upper end of the drill stem be made cylindrical so that it may pass thru the stuffing box without allowing escape of fluid about the same. It is difficult under ordinary circumstances to communicate rotative movement to a cylindrical drill stem.

My invention includes the particular construction of the drive stem so that it may be cylindrical and still adapted to engage with driving means upon the rotary and be thus driven.

It is an object of the invention to provide a drive stem and means upon the rotary to engage therewith and communicate rotative movement to the drill stem while it is moving vertically into the well.

I desire to provide a particular construction of driving bushing to be used in a rotary table which has means to co-operate with the particular construction of drive stem employed and to rotate said stem.

Referring to the drawings herewith wherein a preferred embodiment of the invention is disclosed, Fig. 1 is a side view, parts being broken away in central vertical section to illustrate the construction of my drive stem and drive bushing.

Fig. 2 is a side view partly broken away showing the connection at the upper end of the drive stem.

Figure 3:
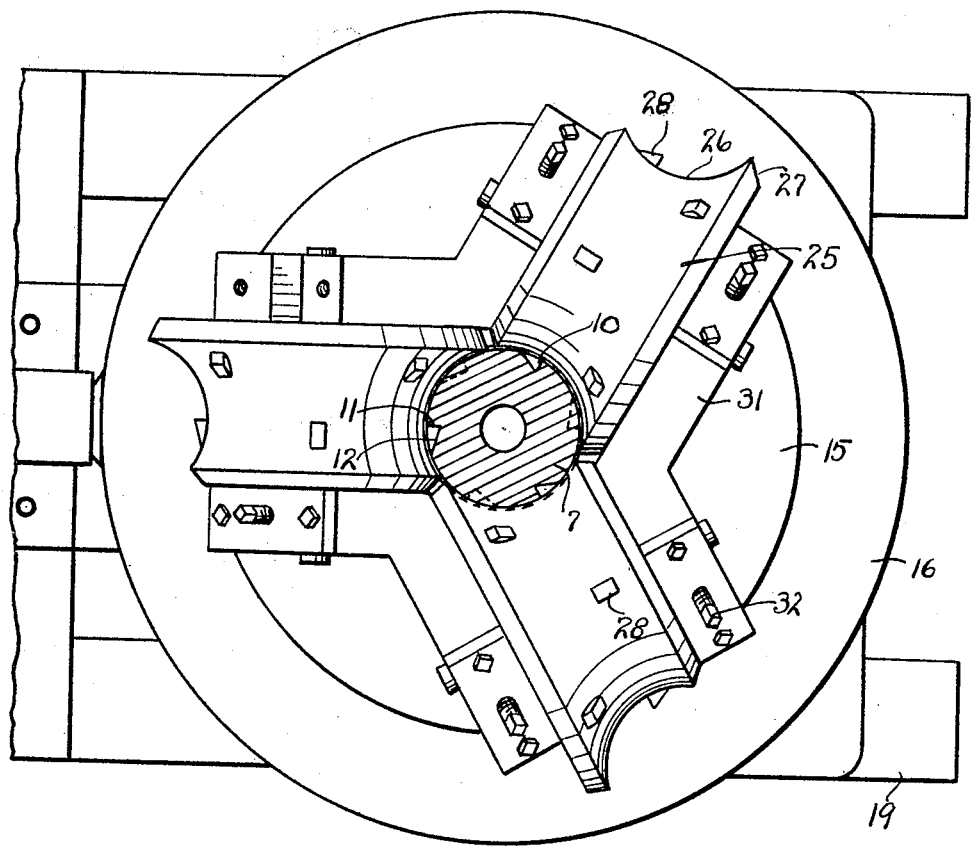
Fig. 3 is a top plan view of the driving means, the drive stem being shown in transverse section.

In carrying out my invention the casing shown at 1, and the casing head 2 thereon, may be of ordinary construction, the upper end of the casing head being threaded at 3 to receive a box 4 in which the packing member 5 may be seated. A gland 6 on the stuffing box may be employed to compress the packing in the box.

The box is adapted to receive a drive stem 7 which fits closely within the stuffing box and is connected by means of a tool joint 8 with the upper end of the drill stem 9.

The drive stem 7 is a tubular member cylindrical on its outer surface and provided with spaced notches 10. Said notches are formed as shown in Fig. 3 having a radial shoulder 11 on one side and an outwardly beveled wall 12 on the other side, the notches being of comparatively short length. As will be seen from Fig. 1, these notches are arranged in vertical alignment but are offset or staggered longitudinally of the stem so that there will be no escape of fluid past the stem because of the close spacing of any two adjacent notches. The upper end of the drill stem is connected at 13 with a swivel 14 which may be of ordinary construction and need not be further described.

The drive bushing 15 is adapted to seat within a rotary table 16 of any desired type. Said rotary table is mounted on bearings 17 adapted to roll upon a bed plate 18 supported upon the frame or skids 19. The table is rotated thru means of a drive pinion 20 engaging with a ring gear 21 on the lower side of the table. This structure is not understood to be novel. The bushing fits within a squared opening 22 in the upper end of the table and has a downwardly tapered extension 23 fitting within a tapered seat in the rotary. The bushing is itself held nonrotatably relative to the rotary.

The bushing 15 has a plurality of drive rollers 25 therein, said rollers being formed with a periphery curved longitudinally at 26 to fit about the drive stem 7. As will be noted from Fig. 3, the rollers are not only curved on their outer surface but are slightly tapered. Each end thereof is also beveled somewhat at 27 so as to allow them to interfit along their meeting edges. The periphery 26 is formed with projecting lugs 28 shaped to fit within the notches 10 in the drive stem. These lugs are spaced apart and so placed upon the rollers that they will engage within the rows of notches 10 in the drive stem as the drive stem is moved downwardly. The staggering of the notches 10 allows one of the teeth or lugs 28 to be engaged in one of the openings 10 at all times with reference to any one of the drive rollers.

The drive rollers are mounted on axles 29 mounted for operation within slots or recesses 30 formed within the upper head 31 of the drive bushing. As will be noted particularly from Fig. 1, the slots 30 are inclined downwardly and inwardly toward the drive stem so that the rollers may be moved down in said slots into firm engagement with the drive stem. When in engaging position the rollers may be held firmly in that position by set screws 32 screwed within plates 33 at the outer ends of the slots 30.

My improved driving means allows the use of a cylindrical flush joint drive stem, and provides a firm engagement between the drive rollers 25 and the notches 10 within the stem. It will be seen from Fig. 3 that there are three lugs or teeth 28 engaging within the drive stem at any one time thus communicating a sufficient driving effort from the drive bushing to the stem. As the drill progresses downwardly in the drilling operation the rollers 26 may rotate in their bearings and engage with the drill stem at all times.

My drive bushing may be easily assembled within the rotary and removed when desired and where no gas pressures are encountered another drive bushing and drive stem may be substituted if desired. The advantages of the device will be obvious to those skilled in the art.

What I claim as new and desire to protect by Letters Patent is:

1. The combination of a rotary table, a drive bushing removably seated in said table, a drive stem extending thru said bushing, said drive stem having shouldered notches therein, and rollers on said bushing having their peripheries curved to conform to the curvature of the drive stem and projecting teeth thereon to engage within said notches and bear against said shoulders.

2. The combination of a rotary table, a drive bushing in said table, a drive stem extending thru said bushing, said drive stem having shouldered notches therein, and rollers on said bushing having their peripheries curved to fit about said drive stem, and separate means on said rollers to engage the said notches in said drive stem.

3. In a well drilling apparatus, a drive stem having notches therein arranged in staggered relation transversely of said stem, and a drive bushing, drive rollers, teeth thereon adapted to engage said notches as said drive stem is moved vertically, and means to rotate said bushing.

4. In a well drilling apparatus, a drive stem having notches therein arranged in staggered relation transversely of said stem, and a drive bushing, drive rollers, mounted on said bushing and shaped to fit about said drive stem, teeth on said rollers adapted to engage said notches as said drive stem is moved vertically, and means to rotate said bushing.

5. A drive stem having approximately V-shaped notches arranged in longitudinal rows thereon, a drive bushing, rollers thereon having their peripheries curved longitudinally to fit said pipe, and means on said rollers to fit said notches to communicate rotative movement to said drive stem from said bushing.

6. In a device of the character described, a cylindrical flush joint drive stem adapted to operate through a stuffing box, driving rollers having their peripheries concaved to closely engage about the curved outer surface of said drive stem, and interengaging means between said drive stem and the concaved surface of said driving rollers whereby rotative movement may be transmitted to said drive stem.

In testimony whereof I hereunto affix my signature this 20th day of August, A. D. 1929.

WILLIAM S. GATTRELL.